Oct. 30, 1923.
W. G. REAGAN
1,472,673
COMBINED EGG CANDLING AND ASSEMBLING DEVICE
Filed Oct. 6, 1921    2 Sheets-Sheet 2
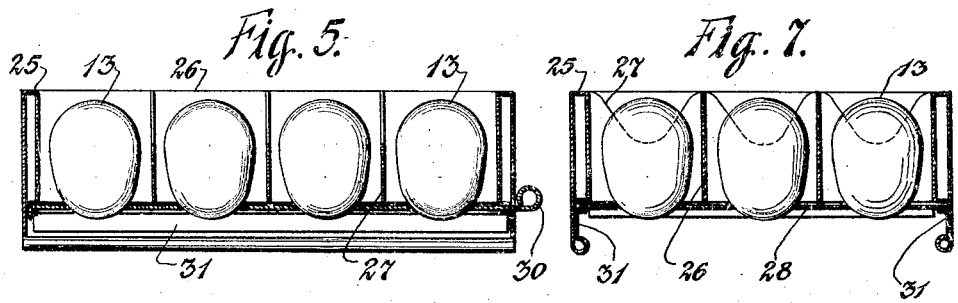
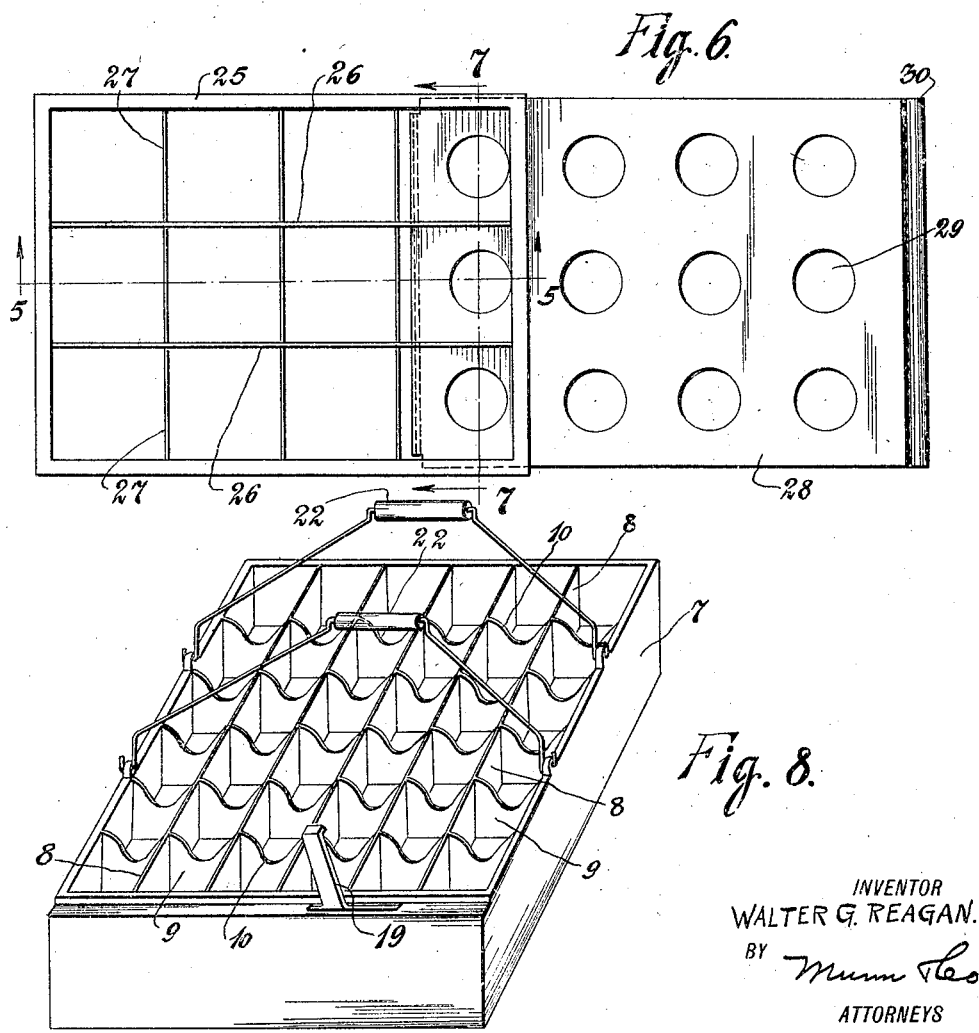
INVENTOR
WALTER G. REAGAN.
BY
ATTORNEYS Patented Oct. 30, 1923.

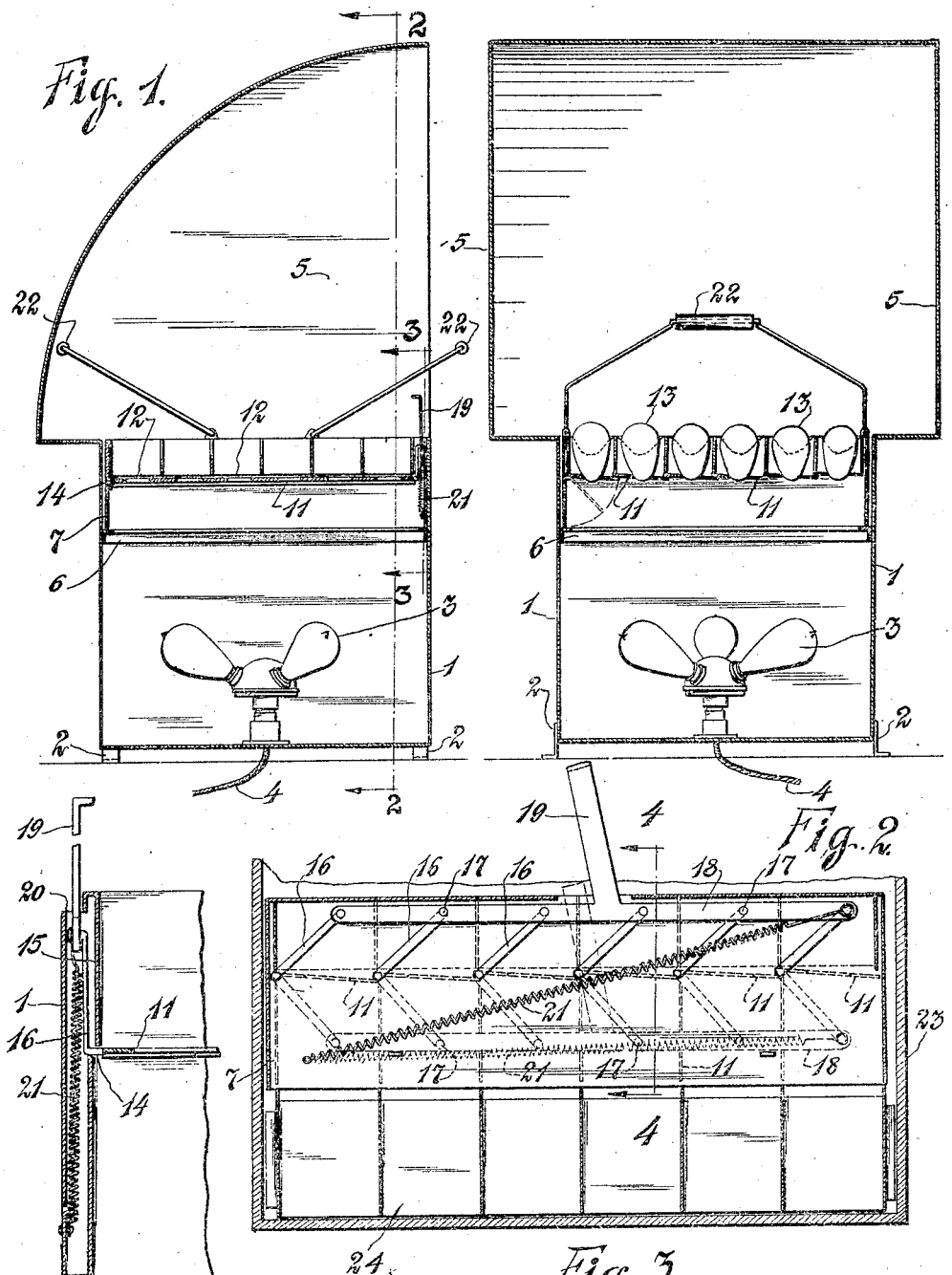

1,472,673

UNITED STATES PATENT OFFICE.

WALTER G. REAGAN, OF LEBANON, INDIANA.

COMBINED EGG CANDLING AND ASSEMBLING DEVICE.

Application filed October 6, 1921. Serial No. 505,855.

*To all whom it may concern:*

Be it known that I, WALTER G. REAGAN, a citizen of the United States, and a resident of Lebanon, in the county of Boone and State of Indiana, have invented a new and useful Improvement in Combined Egg Candling and Assembling Devices, of which the following is a full, clear, and exact description.

An object of my invention is to provide a device by means of which a plurality of eggs may be candled simultaneously, thereby resulting in economy in the candling operation.

A further object of my invention is to provide a device in which a candling tray containing the eggs is arranged so as to deposit the eggs in an egg case in the same relative position which they occupy in the candling tray, thus obviating the necessity of removing the eggs by hand from the candling tray, and depositing them in the egg case.

A further object of my invention is to provide a device of the type described which is relatively simple in construction.

Other objects and advantages will appear in the following specification, and the novel features of the invention will be particularly pointed out in the appended claims.

My invention is illustrated in the accompanying drawings, forming part of this application, in which—

Figure 1 is a vertical sectional view through the egg candling device,

Figure 2 is a vertical section along the line 2—2 of Figure 1,

Figure 3 is an enlarged section substantially along the line 3—3 of Figure 1, showing the tray in position to deposit eggs into the egg case.

Figure 4 is an enlarged section along the line 4—4 of Figure 3,

Figure 5 is a modified form of the device along the line 5—5 of Figure 6,

Figure 6 is a plan view of a modified form of the tray,

Figure 7 is a section along the line 7—7 of Figure 6, and

Figure 8 is a perspective view of the tray disclosed in Figures 1 and 2.

In carrying out my invention, I provide a casing 1 which may be made of any suitable material, such as metal, wood or the like, and supported preferably on legs 2. Within the casing is an electric light cluster 3 which is adapted to be connected by the conductor 4 with any suitable source of current.

The top part of the casing is expanded to form a hood 5 which is open on one side only.

On the interior of the casing 1 is a bracket 6 which is arranged to support the candling tray. The general form of the candling tray is best shown in Figure 8. It consists of a frame 7 having a series of longitudinal partitions 8 with transverse partitions 9 at right angles thereto. The transverse partitions 9 are preferably cut away at 10 so as to provide means for readily grasping eggs. The partitions 8 and 9 thus arranged form a series of compartments, each arranged to hold an egg. In the present instance, there are thirty-six compartments. The bottoms of these compartments are formed by a series of hinged plates, such as those shown at 11. In the present instance, there are 6 of these hinged plates, as shown in Figure 2, each plate being provided with openings 12 arranged to receive the bottom portion of an egg 13, so as to aid in retaining the egg in position. As will be seen from Figure 1, the bottom 11 is journaled at one end by means of a trunnion 14, which enters the side of the casing. The opposite end of the bottom extends through an inner wall 15 (see Figure 4) and each trunnion 14 has rigidly secured thereto an arm 16 (see Figure 3). The outer end of each of the arms 16 is pivotally connected at 17 with a bar 18, which has a handle 19 arranged to project through a slot 20. A spring 21 is fastened to the bar 18 at one end and to the opposite end of the lower part of the tray frame 7 at the other end. The arms 16, when in the position shown in Figure 3, are acted on by the spring 21 to maintain the hinged bottoms 11 in closed position. When the handle 19 is pushed downwardly, however, the bar 18 will be swung into the dotted line position shown in Figure 3, and this will bring the bottoms into the dotted line position. The spring 21, however, will have shifted its position so as to hold the bottoms open.

The mechanism for operating the bottoms simultaneously is preferably located between the wall 15 and the outer wall of the casing 1.

From the foregoing description of the various parts of the device, the operation thereof may be readily understood. In the use of the device, eggs are placed in the compartments of the tray, the bottoms of the eggs resting in the openings 12, the handle 19 being in the full-line position shown in Figure 3. The tray is then lifted by means of the handle 22 and placed in the frame 1, so as to rest on the bracket 6. The operator then candles the eggs by viewing them through the open end of the hood. Any stale eggs may be removed and other eggs placed in their position. When the operator has satisfied himself as to the condition of the eggs, he then removes the tray by means of the handle and places it on the inside of the egg crate 23, where it rests on the pasteboard partitions 24, which form the compartments into which the egg crate is divided. It will be observed that the compartments in the candling tray register with the compartments in the egg crate. Now, by pressing downwardly on the handle 19, the hinged bottoms are moved downwardly, so as to permit the egg from each compartment of the tray to drop into a corresponding compartment in the egg case. The candling tray is then removed, and on a slight upward pull of the handle 19, the hinged bottoms 11 will snap back into place and be held there by the tension of the spring 21, ready to receive another batch of eggs. It will be seen that with this device, the necessity of grasping the eggs with the hand and holding them up to properly candle them one by one is obviated. Furthermore, the time lost in distributing the candled eggs in the egg cases in the ordinary way is obviated, since by merely pressing the handle the eggs on the tray are immediately placed in the case in their proper positions.

In practice, I prefer to use an egg tray of thirty six compartments, so as to fit over and register with the compartments in one-half of an egg crate. Obviously, however, the number of compartments could be varied, without departing from the invention. Thus in Figures 5, 6 and 7, I have shown a crate having only a dozen compartments. Such a crate is used in transporting eggs, as well as candling them.

In the modified form, a frame 25 is provided with longitudinal partitions 26 and transverse partitions 27, making a series of compartments. The bottoms of these compartments are formed by a single slide 28, having openings 29 to register with the compartments. This slide is preferably made of metal and is turned up at one end to provide a handle 30. The slide enters a slot in the frame 25, and is preferably supported on brackets 31. In this form of the device, eggs may be placed in the tray when the slide is in the position shown in Figures 5 and 7, and the tray containing the eggs may then be placed in the frame 1, and the eggs candled in the manner described. The tray may be then removed, and the eggs left in the tray until they have been delivered to the consumer. Instead of taking the time to remove each egg or to run the risk of breaking the eggs by dumping them out, all that is necessary is to place the tray on a supporting surface and pull out the slide, when the eggs will be immediately deposited on the surface without any danger of breakage. In both of these forms of trays, it will be observed that the eggs are held in openings in the bottoms of the tray, which openings also serve as light openings for the candling process. The bottoms of each tray are removable so as to deposit the eggs through the bottom of the tray. In each form of the device a number of eggs may be candled simultaneously, without the necessity of removing the eggs from the tray or of turning them.

I claim:

1. A candling tray having a plurality of compartments therein, a swingable bottom for each compartment, means for moving said bottoms into opened position, said means being adapted to lock said bottoms in opened position.

2. A candling tray having a plurality of compartments therein, a swingable bottom for each compartment, arms rigidly connected to said bottoms and being adapted to actuate the latter, and spring means for yieldingly holding said arms in opened or closed position, whereby said bottoms are held in opened or closed position.

WALTER G. REAGAN.